United States Patent [19]

Enomoto

[11] 3,731,558
[45] May 8, 1973

[54] LINE PRESSURE REGULATING SYSTEM FOR AUTOMATIC POWER TRANSMISSION

[75] Inventor: Koji Enomoto, Yokohama, Japan

[73] Assignee: Nissan Motor Company, Limited, Kanagawa-ku, Yokohama, Japan

[22] Filed: Dec. 14, 1971

[21] Appl. No.: 207,749

[30] Foreign Application Priority Data

Dec. 18, 1970  Japan ............................. 45/113221

[52] U.S. Cl. ........................................ 74/867, 74/759
[51] Int. Cl. ........................... B60k 21/00, F16h 57/10
[58] Field of Search .............. 74/867—869, DIG. 1

[56] References Cited

UNITED STATES PATENTS

| | | | |
|---|---|---|---|
| 3,453,908 | 7/1969 | Iijima | 74/867 |
| 3,507,170 | 4/1970 | Hanzi et al. | 74/869 |
| 3,643,527 | 2/1972 | Ohnuma | 74/868 |

*Primary Examiner*—Arthur T. McKeon
*Attorney*—John Lezdey

[57] ABSTRACT

A line pressure regulating system for an automatic power transmission of a motor vehicle, which system comprises a regulator valve having an axially movable spool and adapted to regulate the output pressure of an engine driven fluid pump, a modulator valve responsive to governor pressure and throttle valve pressure for providing a modulator valve pressure to the regulator valve, and a ball valve responsive to the throttle valve pressure and modulator valve pressure for furnishing the regulator valve with the higher one of the throttle valve pressure and modulator valve pressure. The modulator valve pressure is kept at zero level at low vehicle speeds and in speed of "R," but is maintained at a level equal to the throttle valve pressure in position "D" and to the line pressure in any of "1", "2" and "3" both at high vehicle speeds. During the drive position "D," when the transmission upshifts to the fourth forward drive ratio, the line pressure is applied to an additional port of the regulator valve exerting a force on the spool in such a direction as to reduce the line pressure. With this arrangement, the line pressure decreases with the increase of vehicle speed. When the selector lever is moved from "D" to any of "1", "2" and "3" during high speed running, the line pressure is immediately maintained at an increased level to augment the effect of engine braking.

8 Claims, 4 Drawing Figures

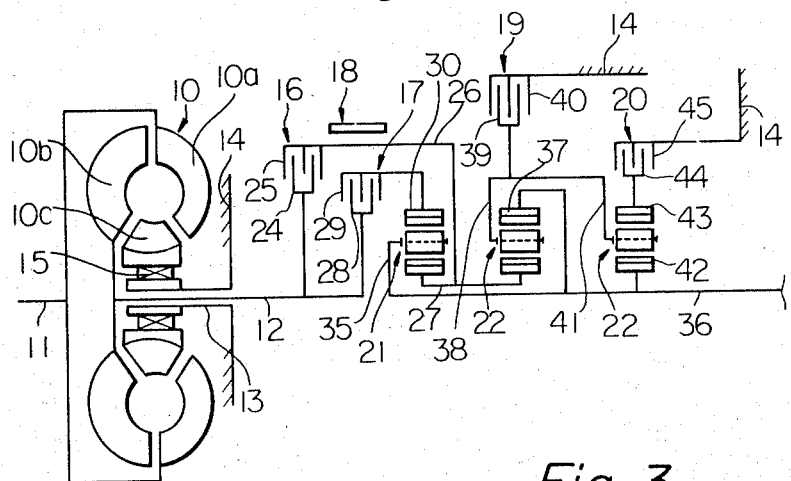
Fig. 1
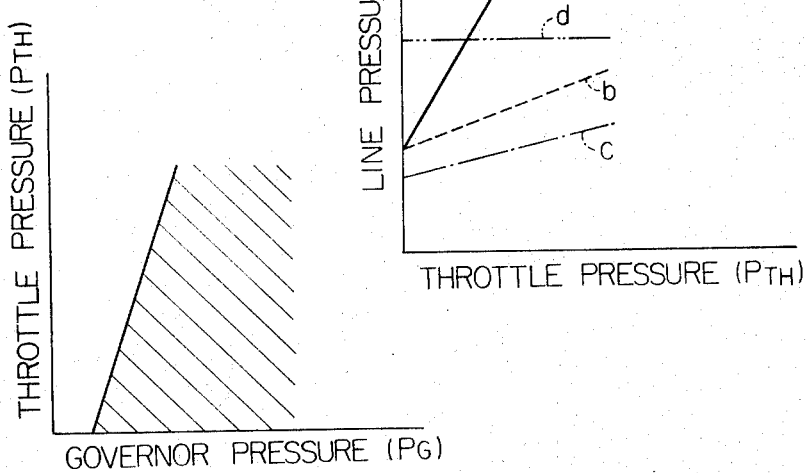
Fig. 3
Fig. 4

LINE PRESSURE REGULATING SYSTEM FOR AUTOMATIC POWER TRANSMISSION

This invention relates to an automatic power transmission of a motor vehicle and more particularly to a line pressure regulating system for regulating line pressure transmitted to the friction-drive-establishing devices of the transmission.

An automatic power transmission is now widely used in various motor vehicles to reduce driver's effort in vehicle operation. A typical one consists of a torque converter, a gear train and a plurality of friction-drive-establishing devices such as friction clutches and brakes which, when actuated, serve to control the relative motions of the individual working elements of the gear train in such a manner as to establish forward and reverse drive power flows from the prime mover to the driven member of the transmission. Actuation of the friction clutches and brakes is effected by energizing a series of solenoid valves through which fluid pressure, called "line pressure," is transmitted to the friction clutches and brakes. It is, in this instance, important to have the line pressure regulated properly in accordance with the varying drive conditions of the motor vehicle, because an excessive line pressure results in unusual mechanical shocks experienced during gear shifting and, on the contrary, an insufficient line pressure invites a slippage in the friction clutches and brakes which, in turn, leads to inability to attain a desired gear ratio. In general, the line pressure must be kept at low levels for high vehicle speeds and at high levels for low vehicle speeds.

In accordance with one embodiment of this invention, there is provided an improved line pressure regulating system to be used in a conventional automatic power transmission which has seven selector positions, that is, "P" (parking), "R" (reverse), "N" (neutral), "D" (drive), "1" (first speed locked), "2" (second speed locked) and "3" (third speed locked). If, in any of the positions "R," "D," "1," "2" and "3," the vehicle is running at low speeds, high engine torques, the line pressure regulating system operates to maintain line pressure at a sufficiently high level to prevent slippage of the friction-drive-establishing devices of the transmission. Further, if, in the drive position "D", the transmission has automatically upshifted to the fourth speed forward drive ratio, the line pressure regulating system provides a reduced line pressure which permits simultaneous actuation of two friction clutches thereby to split the power flow from the vehicle engine to the transmission output shaft, into two parallel branches. On the other hand, if the selector lever is moved from the position "D" to "1," "2" or "3" during high speed running, the line pressure regulator provides, at zero or light throttles, as increased line pressure that is sufficiently high as compared with that available in the drive position "D," to thereby increase the engine braking effect.

It is an object of this invention to provide an improved line pressure regulating system for an automatic power transmission that is capable of controlling line pressure in accordance with the varying drive conditions of the motor vehicle.

This and other objects will be readily apparent from the following description of the invention taken in conjunction with the accompanying drawings, in which:

FIG. 1 is a schematic view of one example of the automatic power transmission to which the line pressure regulating system of this invention is applicable;

FIG. 3 is a graph illustrating the line pressure provided by the line pressure regulator of FIG. 2 under different drive conditions, against throttle valve pressure; and FIG. 4 illustrates the manner in which the spool of the modulator valve shown in FIG. 2 is moved upward and downward under the action of governor pressure and the throttle valve pressure.

Figure 2:
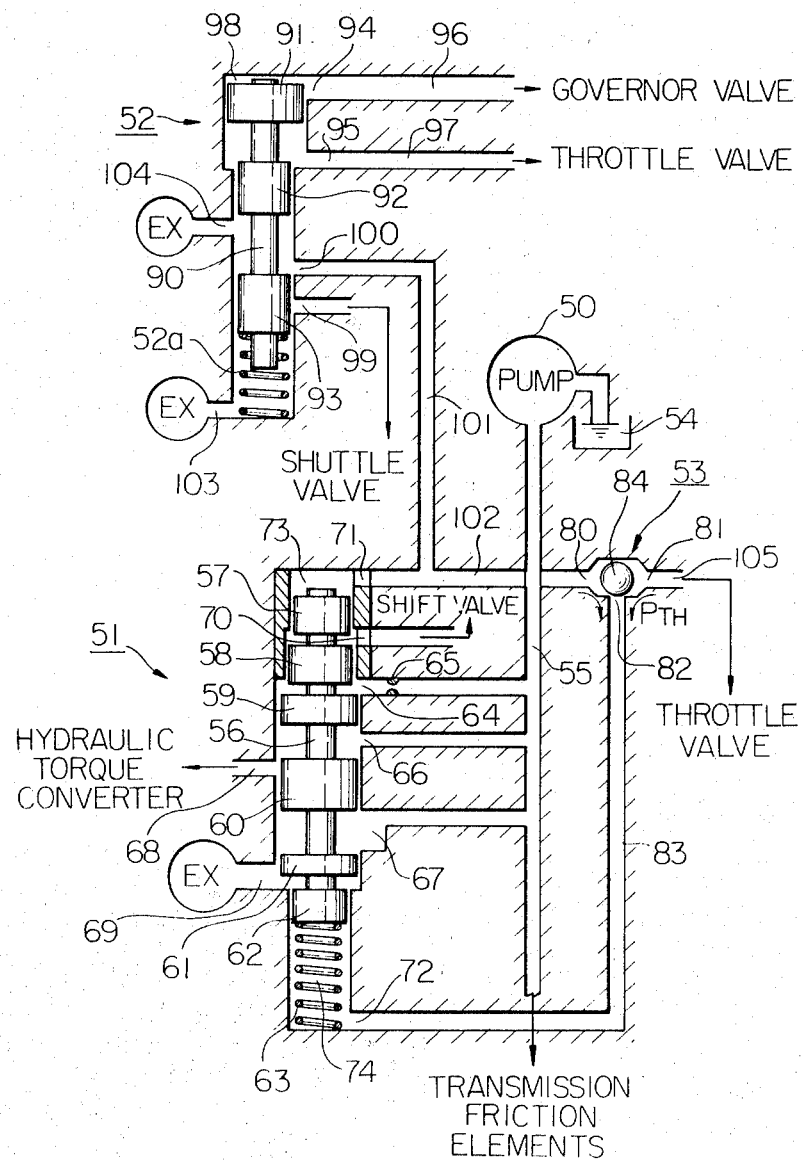
FIG. 2 is a schematic view of the line pressure regulating system according to this invention.

The line pressure regulating system of the present invention will be herein shown and described as applied to an automatic power transmission which has gearing providing four forward drive ratios and one reverse ratio and a hydrodynamic torque converter by way of example only. It should, however, be understood that the line pressure regulator of this invention is also applicable to a wide variety of automatic power transmissions.

Referring now to FIG. 1, the automatic power transmission to which this invention is applied is shown diagrammatically. The automatic power transmission comprises a hydrodynamic torque converter 10 having a bladed impeller or pump 10a, a bladed rotor or turbine 10b, and a bladed reaction element or stator 10c. The impeller 10a is driven from a drive shaft 11 connected to a suitable prime mover such as an internal combustion engine (not shown), and the rotor 10b is drivingly connected to a turbine shaft 12. The stator 10c is rotatably mounted on a mechanism comprising a hollow shaft 13 connected to a transmission housing 14 and a one-way brake 15 disposed between the stator 10c and the hollow shaft 13. The one-way brake 15 may be of any suitable construction and is so arranged so as to allow a free rotation of the stator 10c only in the forward direction of the vehicle.

The automatic power transmission also comprises first and second hydraulically operated friction clutches 16, 17, first, second and third hydraulically operated brakes 18, 19, 20, and first, second and third planetary gear sets 21, 22, 23. The first friction clutch 16 may be of any suitable construction and in the illustrated embodiment comprises a drive portion 24 connected to the turbine shaft 12, and a driven portion 25 connected to a brake drum 26 which is integral with a hollow shaft 27. Similarly, the second friction clutch 17 comprises a drive portion 28 connected to the turbine shaft 12, and a driven portion 29 connected to an internally toothed outer ring gear 30 of the first planetary gear set 21. The first friction brake 18 includes a break band adapted to act on the brake drum 26 for braking or releasing the sun gears of the first and second planetary gear sets 21, 22 through the hollow shaft 27.

The pinion carrier 35 of the first planetary gear set 21 is connected to a driven shaft 36 of the transmission which in turn is connected to driving wheels of the motor vehicle (not shown). Also connected to the driven shaft 36 is an internally toothed outer ring gear 37 of the second planetary gear set 22 having its pinion carrier 38 connected to a rotor portion 39 of the second friction brake 19, the stator portion 40 thereof being connected to the transmission housing 14. The pinion carrier 38 of the second planetary gear set 22 is also connected to a pinion carrier 41 of the third planetary gear set 23 having its sun gear 42 connected to the driven shaft 36. The internally toothed outer ring gear 43 of the third planetary gear set 23 is connected to a rotor 44 of the third friction brake 20 having its stator 45 connected to the transmission housing 14. The transmission thus constructed operates in a manner well known to provide for automatically selected forward drive ratios, and a single reverse drive ratio, through selective coupling of the friction clutches and brakes.

The operating conditions of the friction clutches and brakes for the different drives are tubulated in Table, where the sign "+" denotes that the related clutch or brake is actuated and the sign "−" denotes that the clutch or brake is kept released.

TABLE

| Drive Range | First Clutch 16 | Second Clutch 17 | First Brake 18 | Second Brake 19 | Third Brake 20 |
|---|---|---|---|---|---|
| First Speed Range | − | + | − | + | − |
| Second Speed Range | − | + | − | − | + |
| Third Speed Range | − | + | + | − | − |
| Fourth Speed Range | + | + | − | − | − |
| Reverse | + | − | − | + | − |

As seen in the Table, the fourth speed range is established by simultaneously actuating the first and second friction clutches 16, 17 for engagement. With the two friction clutches 16, 17 engaged, the power flow from the turbine shaft 12 to the driven shaft 36 is split into two parallel branches including the friction clutches 16, 17, so that a reduced line pressure is sufficient to cause the friction clutches to be engaged without causing any slippage.

In FIG. 2, there is shown diagrammatically a line pressure regulating system of this invention which provides a regulated pressure to the friction elements of the transmission thereby to selectively effect shifts between the different speed ranges.

The line pressure regulating system comprises, essentially, an engine driven fluid pump 50, a regulator valve 51, a modulator valve 52 and a ball valve 53. The engine driven fluid pump 50 is adapted to deliver fluid under pressure from a sump 54 to a main line 55 which is connected to the friction elements of FIG. 1 through other control means such as manual valves (not shown).

As shown, the regulator valve 51 includes a valve spool 56 which is axially slidable and has spaced lands 57, 58, 59, 60, 61, 62 thereon. A coiled spring 63 is mounted at the lower end of the regulator valve 51 to bias the valve spool 56 upward in the drawing. The pressure in the main line 55 (which is the "line pressure" described above) is transmitted through a port 64 having an orifice 65 to the space between the lands 58, 59, so that the spool 56 is biased downward due to the difference between the facing areas of the lands 58, 59 subject to the pressure. The line pressure also enters the space between the lands 59, 60 and the space between the lands 60, 61 through ports 66, 67, respectively. The port 66 is not in communication with a port 68 when the spool 56 is in the position as shown the port 68 being in communication with a hydraulic torque converter (not shown). Likewise, when the spool 56 is in this position, the port 67 is interrupted from communication with an exhaust port 69. However, as the spool 56 is moved downward, the port 66 is brought into communication with the port 68, permitting the main line 55 to be drained off. Further movement of the spool 56 in the downward direction communicates the port 67 with the exhaust port 69 through the space between the lands 60, 61, permitting exhaust of the main line 55.

The regulator valve 51 also has a port 70 communicating with the space between the lands 57, 58, and ports 71, 72 communicating with end chambers 73, 74, respectively, which are defined at the upper and lower end of the regulator valve 51, respectively. The port 70 is connected to a shift valve or other suitable valve (not shown) for furnishing line pressure to the port 70 only when the vehicle is running at the fourth speed. The line pressure entering the space between the lands 57, 58 through the port 70 acts to bias the spool 56 downward due to the difference between the facing areas of the lands 57, 58.

The ball valve 53 has a first inlet port 80 connected to the port 71 of the regulator valve 51, a second inlet port 81 connected to a throttle valve (not shown), and an outlet port 82 coupled to a ball valve line 83 leading to the port 72 of the regulator valve 51. The ball valve 53 comprises a free-floating ball 84 which moves in response to fluid pressure to control communication between the inlets 80, 81 and outlet 82. The throttle valve is of any suitable construction and has an inlet port communicated with the engine driven fluid pump 50, and an outlet port for furnishing the second inlet port 81 with a throttle valve pressure proportional to engine torque, although not shown.

The modulator valve 52 is shown to include an axially slidable spool 90 having spaced lands 91, 92, 93 thereon. The spool 90 is biased upwardly by a spring 52a as shown in FIG. 2. Ports 94, 95 provide inlets for a governor line 96 and a throttle valve line 97, respectively. The governor line 96 is connected to a governor valve (not shown) of the conventional type which is operatively associated with the transmission output shaft 36 to provide a regulated pressure proportional to vehicle speed, which is called "governor pressure." The throttle valve line 97 is connected to the above-described throttle valve. Governor pressure enters an end chamber 98 through the port 94 and biases the spool 90 in the downward direction. Throttle valve pressure, on the other hand, enters the space between the lands 91, 92 through the port 95 and exerts a force on the large land to force the spool 90 in the opposite direction, that is, in the upward direction.

The modulator valve 52 also has a port 99 connected to another shuttle valve or other suitable valve (not shown), and a port 100 coupled to a modulator pressure line 101. The modulator pressure line 101, in turn, is connected to a line 102 connecting the port 71 of the regulator valve 51 and the first inlet 80 of the ball valve 53. The shift valve or other suitable valve provides line pressure or throttle valve pressure to the port 99 in a predetermined manner which will be described later. When the valve spool 90 is in the upward position by the force of the spring 52a, the port 99 is not in communication with the port 100 and, on the other hand, the port 100 is in communication with an exhaust port 104. However, movement of the valve spool 90 in the downward direction against the force of the spring 52a communicates the port 99 with the port 100 through the space between the lands 92, 93 and simultaneously causes the land 92 to block the exhaust port 104. When this occurs, the line pressure or throttle valve pressure prevailing in the port 99 is transmitted through lines 101, 102 to the regulator valve 51 as well as the ball valve 53.

The operation of the line pressure regulator as shown in FIG. 2 is as follows:

In position "N," there is no fluid pressure fed to the port 70 as well as to the port 71. The line pressure entering the space between the lands 58, 59 through the port 64 exerts a force on the large land tending to force the spool 56 downward against the action of the coiled spring 63. When the spool 56 is moved downward, the port 66 is brought into communication with the port 68 to admit the line pressure in the main line 55 into the hydraulic torque converter (not shown), so that the line pressure is reduced. The reduction in line pressure causes a decrease in the pressure transmitted through the port 64 to the space between the lands 58, 59, with a resultant reduction in the force tending to move the spool 56 downward. This will again move the spool 56 upward. Thus, the line pressure is automatically maintained at a certain level as determined by the biasing force F of the coiled spring 63 and the difference in facing areas subject to pressure between the lands 58, 59. If the amount of fluid delivered from the pump 50 increases, the spool 56 is further moved downward, so that the port 67 is brought into communication with the exhaust port 69, resulting in a reduction in line pressure to the predetermined level. It is to be noted, in this connection, that the orifice 65 in the port 64 provides time delay for the pressure in the space between the lands 58, 59 to thereby prevent hunting of the spool 56 which would otherwise take place due to the fluctuation of pump delivery pressure.

When, in position "D," "1," "2,", "3" or "R," the vehicle is running at low speeds, the spool 90 of the modulator valve 52 remains in the raised position as shown, since the governor pressure $P_G$ trnamitted to the port 94 is low for "D," "1," "2" or "3" and zero for "R." Under these conditions, the port 99 is blocked by the land 93 and the modulator pressure line 101 is exhausted by the exhaust port 104, so that there is no modulator pressure fed to the regulator valve 51 as well as to the ball valve 53. Thus, the throttle valve pressure entering the second inlet 81 of the ball valve 53 moves the ball 84 leftward in the drawing to block the first inlet 80, with a concomitant communication between the throttle valve pressure line 105 and the ball valve pressure line 83. It follows that the throttle valve pressure enters the end chamber 74 of the regulator valve 51 through the port 72, exerting a force on the end of the spool 56 tending to move it upward. As will be understood, the line pressure transmitted to the ports 66, 67 has no effect to move the spool 56 upward or downward, since there is no difference between the facing areas of the lands 59, 60 and 61. Consequently, the movement of the spool 56 is controlled by the line pressure routed through the port 64 to the space between the lands 58, 59, the throttle valve pressure transmitted through the port 72 to the end chamber 74, and the biasing force of the coiled spring 63. If the spool 56 is in equilibrium under the action of the three forces, the following equation is obtained:

$$(A_3 - A_2)P_L = A_4 P_{TH} + F$$

wherein $A_2$, $A_3$ and $A_4$ = facing area of the lands 58, 59 and 62, respectively; and $E$ = biasing force of the coiled spring 63.

Thus, the line pressure $P_L$ is given by:

$$P_L = \{A_4/(A_3 - A_2)\} P_{TH} + F/(A_3 - A_2) \quad (1)$$

The line pressure $P_L$ is graphically represented in FIG. 3, in which the straight line $a$ indicates the variation of line pressure as determined by the equation (1).

In position "D," as vehicle speed increases, governor pressure will increase and move the modulator valve spool 90 downward in the drawing. On the other hand, throttle valve pressure enters the space between the lands 91, 92, exerting a force on the large land tending to move the spool 90 upward. Thus, assuming that $B_1$ and $B_2$ represent facing area of the lands 91, 92, respectively and that $f$ represents the biasing force of the spring 52a if the following inequality holds, $$B_1 P_G > (B_1 - B_2) P_{TH} + f$$

the spool 90 is moved to and remains in the lowered position. On the contrary, if $B_1 P_G < (B_1 - B_2) P_{TH} + f$ the spool 90 remains in the raised position as shown. FIG. 4 illustrates the manner in which the spool 90 is moved upward and downward under the action of governor pressure and throttle valve pressure. In the figure, the hatched area corresponds to the pressure conditions under which the spool 90 remains in the lowered position. In this position, the exhaust port 104 is blocked by the land 92, and the port 99 connected to the shuttle valve (not shown) is communicated with the modulator pressure line 101. The shuttle valve is arranged in a usual manner to provide throttle valve pressure to the port 99 when the selector lever is in the drive position "D," while, in position "R," "1," "2" or "3," the valve furnishes the port 99 with line pressure. Thus, in the drive position "D," throttle valve pressure is fed through the modulator pressure line 101 to the port 71 of the regulator valve 51 as well as to the first inlet 80 of the ball valve 53. In this instance, movement of the regulator valve spool 56 is controlled by the throttle valve pressure transmitted to the port 71, line pressure routed to the port 64, throttle valve transmitted to the port 72 and the biasing force of the coiled spring 63.

If the spool 56 is in equilibrium, the following equation results:

$$(A_3 - A_2) PL + A_1 P_{TH} = A_4 P_{TH} + F$$

wherein $A_1$ represents facing area of the land 57 subject to pressure. Thus, the line pressure $P_L$ is given by:

$$P_L = \{(A_4 - A_1)/(A_3 - A_2)\} P_{TH} + F/(A_3 - A_2) \quad (2)$$

The line pressure as determined by the above equation (2) is indicated by $b$ in the graph of FIG. 3. It will be understood from the comparison of the lines *a* and *b* of FIG. 3 that when the vehicle is running at higher speeds, the line pressure $P_L$ is kept at lower levels.

In position "D," as vehicle speed further increases to such a level as to cause the transmission to upshift to the fourth speed range, the shift valve (not shown) connected to the port 70 is actuated to provide line pressure which exerts a force on the large land 58 tending to move the spool 56 downward. This further application of line pressure moves the spool 56 downward to a certain position where the spool 56 is in equilibrium under the action of the five forces, as determined by the following equation:

$$(A_3 - A_2)P_L + A_1 P_{TH} + (A_2 - A_1)P_L = A_4 P_{TH} + F$$

Thus, the line pressure $P_L$ is obtained by:

$$P_L = \{(A_4 - A_1)/(A_3 - A_1)\} P_{TH} + F/(A_3 - A_1) \quad (3)$$

The line pressure $P_L$ is indicated by C in FIG. 3. As will be readily apparent from the graph, the line pressure is further reduced during the fourth speed. The reduction in line pressure is primarily intended for actuation of the first and second friction clutches 16, 17 only, as seen in Table. Since, with the first and second friction clutches 16, 17 actuated, the power flow the turbine shaft 12 to the driven shaft 36 is split into two parallel branches including the friction clutches, a reduced line pressure will suffice to keep the clutches actuated.

If, during high speed, the selector level is moved from "D" to any of "1," "2" and "3," since the shuttle valve (not shown) connected to the port 99 of the modulator valve 52 is designed to provide line pressure $P_L$ at that selector position, as described above, the line pressure is transmitted through the modulator pressure line 101 to the port 71 of the regulator valve 51 as well as to the first inlet 80 of the ball valve 53. When this occurs, the ball 84 is moved rightward in the drawing to block the second inlet 81, so that the line pressure is transmitted through the ball valve line 83 to the end chamber 74, exerting a force on the end of the spool 56 tending to move it upward. The line pressure routed through the line 101 also enters the end chamber 73 through the port 71 and exerts a force on the end of the spool 56 tending to move it downward. Accordingly, it will be appreciated that it regulator valve spool 56 is moved under the action of the four forces, that is, the three line pressures transmitted to the end chamber 73, the space between the lands 58, 59, and the end chamber 74, respectively, and the biasing force of the coiled spring 63. When the spool 56 is in equilibrium, the following equation can be obtained:

$$(A_3 - A_2)P_L + A_1 P_L = A_4 P_L + F$$

Thus, the line pressure $P_L$ is given by:

$$P_L = F/(A_3 - A_2 + A_1 - A_4) \quad (4)$$

As indicated by *d* in the graph of FIG. 3, the line pressure of equation (4) remains high and does not vary with throttle valve pressure. The fact that the line pressure is set at such a high level as indicated by *d* when the selector level is moved to any of the positions "1," "2" and "3" during high speed running serves to increase the effect of engine braking. However, in this instance, the increased line pressure is removed when vehicle speed has decreased below a predetermined value due to the engine braking action, since the decrease of vehicle speed causes upward movement of the modulator valve spool 90 to permit exhaust of the modulator pressure line 101, so that the ball 84 of the ball valve 53 is moved to the left in the drawing. When this occurs, the line pressure prevailing in the main line 55 follows the straight line as indicated by *a* in FIG. 3.

While only one preferred embodiment of this invention has been described, it will be readily apparent to those skilled in the art that many changes or variations of arrangements may be made without departing from the spirit of this invention.

What is claimed is:

1. A line pressure regulating system for an automatic power transmission of a motor vehicle, said automatic power transmission having a hydraulic torque converter, and gearing providing a plurality of forward drive ratios and one reverse ratio controlled by a hydraulic control device having a plurality of friction elements, said control device being controllable by a manual selector having at least four selector positions, that is, "D," "N," "R" and any of "1," "2" and "3," said line pressure regulating system comprising a main line leading from the outlet port of an engine driven fluid pump to said hydraulic control device, a regulator valve connected to said main line and having an axially movable spool therein, said spool being movable in one direction to increase the pressure in said main line, called "line pressure," and in the opposite direction to reduce the line pressure, said line pressure exerting a force on said spool tending to move it in said opposite direction, means for biasing said spool in said one direction, means responsive to vehicle speed for providing a first pressure proportional to the vehicle speed, means responsive to engine torque for providing a second pressure proportional to the engine torque, a modulator valve having an axially movable spool therein, said first pressure exerting a force on said modulator valve spool tending to move it in one direction, said second pressure exerting a force on said modulator valve spool tending to move it in the opposite direction, said modulator valve providing no output pressure when said spool is moved in the opposite direction under the action of said first and second pressures, said modulator valve providing a third pressure when said spool is moved in said one direction under the action of said first and second pressures, said third pressure being equal to said second pressure during the drive position "D" and to said line pressure during any of other selector positions excluding "N" and "R" said third pressure exerting a force on said regulator valve spool tending to move it in said opposite direction, and means responsive to said second and third pressures for providing a fourth pressure equal to the higher one of said second and third pressures, said fourth pressure exerting a force on said regulator valve spool tending to move it in said one direction.

2. A line pressure regulating system according to claim 1, and further comprising means for providing a fifth pressure equal to said line pressure when the transmission is conditioned for the lowest one of the forward drive ratios during the drive position "D," said fifth pressure exerting a force on said regulator valve spool tending to move it in said opposite direction.

3. A line pressure regulating system according to claim 1, wherein said regulator valve has first, second and third ports coupled to said main line, a fourth port connected to said modulator valve, a fifth port connected to said means for providing a fourth pressure, a sixth port coupled to said hydraulic torque converter, and a seventh port coupled to an exhaust, said regulator valve spool having first, second, third, fourth, fifth and sixth spaced lands provided thereon, said line pressure entering the space between said second and third lands through said first port to exert a force on said third land tending to move said spool in said opposite direction, said second port being communicated with said sixth port through the space between said third and fourth lands when said spool is moved in said opposite direction to a first predetermined position, said third port being communicated with said seventh port through the space between said fourth and fifth lands when said spool is moved to a second predetermined position which is away from said first predetermined position in said opposite direction, said fourth port communicating with one end chamber adjacent said first land, said fifth port communicating with the other end chamber adjacent said sixth land, said means for biasing said regulator valve spool in said one direction comprising a coiled spring mounted in said the other end chamber.

4. A line pressure regulating system according to claim 3, and further comprising means for providing a fifth pressure equal to said line pressure when the transmission is conditioned for the lowest one of the forward drive ratios during the drive position "D," said regulator valve having an eighth port connected to said means for providing a fifth pressure, said fifth pressure entering the space between said first and second lands through said eighth port to exert a force on said second land tending to move said spool in said opposite direction.

5. A line pressure regulating system according to claim 1, wherein said means for providing a first pressure comprises a governor valve operatively associated with the output shaft of the automatic power transmission to provide a governor pressure proportional to vehicle speed.

6. A line pressure regulating system according to claim 1, wherein said means for providing a second pressure comprises a throttle valve for providing a throttle pressure proportional to engine torque.

7. A line pressure regulating system according to claim 1, wherein said modulator valve has a first port connected to said means for providing a first pressure, a second port coupled to said means for providing a second pressure, a third port connected to said regulator valve as well as to said means for providing fourth pressure, a fourth port connected to means for providing no output pressure when said spool is moved in the opposite direction under the action of said first and second pressures and for providing a third pressure when said spool is moved in said one direction under the action of said first and second pressures, said third pressure being equal to said second pressure during the drive position "D" and to said line pressure during any of other selector positions excluding "N" and "R" and fifth and sixth ports coupled to an exhaust, said modulator valve spool having first, second and third spaced lands provided thereon, said first pressure entering one end chamber adjacent said first land through said first port to exert a force on said first land tending to move said spool in said one direction, said second pressure entering the space between said first and second lands through said second port to exert a force on said first land tending to move said spool in said opposite direction, said third port communicating with the space between said second and third lands at all times, said fourth port being communicated with the space between said second and third lands when said spool is moved in said one direction, said fifth port being communicated with the space between said second and third lands when said spool is moved in said opposite direction but being blocked by said second land when said spool is moved in said one direction, and said sixth port being communicated with said fourth port through the other end chamber of said modulator valve when said spool is moved in said opposite direction.

8. A line pressure regulating system according to claim 1, wherein said means for providing a fourth pressure comprises a ball valve regulated by the position of a free-floating ball which moves in response to said second and third pressures, said ball valve having a first inlet port connected to said modulator valve, a second port connected to said means for providing a second pressure and an outlet port coupled to said regulator valve.

* * * * *